United States Patent [19]

Breitling

[11] Patent Number: 4,936,127

[45] Date of Patent: Jun. 26, 1990

[54] PRODUCTION OF COPPER ROD BY ROLLING

[75] Inventor: Darrel W. Breitling, Amarillo, Tex.

[73] Assignee: Asarco Incorporated, New York, N.Y.

[21] Appl. No.: 356,730

[22] Filed: May 25, 1989

[51] Int. Cl.$^5$ .................. B21B 27/10; B21B 45/02
[52] U.S. Cl. .................................... 72/42; 72/236
[58] Field of Search ............... 72/41, 42, 43, 44, 45, 72/236; 252/49.5; 324/61 R, 61 P

[56] References Cited

U.S. PATENT DOCUMENTS

| | | | |
|---|---|---|---|
| 3,275,018 | 9/1966 | Roberts | 324/61 P |
| 3,911,704 | 10/1975 | Bridenbaugh et al. | 72/42 |
| 4,024,742 | 5/1977 | Vucich et al. | 72/42 |
| 4,202,193 | 5/1980 | Wilson | 72/42 |

Primary Examiner—E. Michael Combs
Attorney, Agent, or Firm—John J. Tomaszewski; Kenneth A. Koch

[57] ABSTRACT

The method of making copper rod by rolling is significantly improved by effectively controlling the water-soluble oil emulsion used to lubricate the rolls by employing a conductivity probe to maintain the conductivity of the emulsion within desired operating limits.

2 Claims, No Drawings

PRODUCTION OF COPPER ROD BY ROLLING

This invention relates to the manufacture of copper rod by rolling and, more particularly, to improving rod quality, roll life and performance by specially controlling the oil-water emulsion used to cool and lubricate the rolls.

Copper rod may be produced in a number of ways and in the most common method employed by industry a continuous copper bar is produced by continuous casting and the copper bar is guided towards a rolling mill where it is converted into rod. A previous procedure employed individually cast wire bars which were also rolled into rod.

Regardless of the method for producing the copper bar to be made into rod, a rolling mill comprising a number of roll stands is used to reduce the bar to the desired size. For example, a total of 17 roll stands may be used to reduce the cast bar to ¼ inch diameter rod whereas if the desired size is 5/16 inch the last two stands would be removed.

Each separate roll stand is generally a complete assembly that slides into position on a guideway at a right angle to the rod rolling direction. A water-soluble oil-water lubricant mixture is delivered to each roll stand to act as a lubricant between casting and rolls and floods the rolls and the copper rod to protect the rolls, and to keep air from oxidizing the copper surface. The water-soluble oil is generally at an elevated temperature in order not to over cool the casting and thus produce too hard a rod. The copper is at a temperature usually about 750 to 1000° C. during the rolling process.

A rolling mill and its roll stands are well-known in the art and, in general, the water-soluble oil is fed to the rolls through pipes or hoses, falls to a common pan beneath the rolls and is transferred to a sump. The emulsion is pumped from the sump through a filter to remove solid particles and collected in a filter sump, where the emulsion is pumped back to the rolling stands. Copious amounts of emulsion are generally used to assure adequate evaporative cooling.

Oils such as mineral oil are generally used to lubricate the internal bearings and gears of the roll stands and suitably placed seals and gaskets serve to minimize the water-soluble oil flood lubricant from being contaminated with the mineral oil.

Upon leaving the rolling mill the rod is flooded with water or other suitable material such as acid, alcohol-water, etc., to further cool and/or treat the rod and is delivered to a machine for coiling and storage. As is standard in the art, pickling of the rod before, during and/or after cooling is performed to produce commercial rod.

The water-soluble oil emulsion is very important to the efficiency and effectiveness of the process since the roll life, emulsion life and rod quality are greatly affected by proper use of the emulsion. While an excessive oil concentration may be employed as a safety factor in the process this is not economical on an industrial scale mainly because of the prohibitive price of the oil. Proper use of the emulsion is affected by the complexity of the rolling operation wherein contamination of the emulsion is a very real problem since it reduces the effectiveness of the process. Some contaminants include hydraulic fluids used to operate mechanical devices like the shearer which cuts the rod, gear box lubricants, copper and copper oxide which flake off the rod and other metals and oils present in the rolling system.

A typical procedure for using the emulsion is to take samples of the emulsion, analyze them for water-soluble oil content, and then adjust the oil level based on the results. Refractometer or Babcock Tests are generally used to perform the analysis but these methods are unreliable due to temperature sensitivity and contaminants which build-up in the emulsion and are time consuming if a rigorous analysis is performed.

There are a number of patents relating to the manufacture of copper rod but none, of which I am aware, disclose a method for enhancing the process by controlling the water-soluble oil emulsion. U.S. Pat. No. 3,589,430 describes a method for the continuous production of copper rod with the essential steps being control of the melt temperature, oxygen content, solidification point, cast billet temperature and hot rolling temperature. In U.S. Pat. No. 4,290,823 copper rod is produced by controlling the oxygen content of the melt. An automatically controlled casting system is shown in U.S. Pat. No. 3,358,743 wherein a number of sensors and analysers are employed.

In U.S. Pat. No. 2,824,846 a method is shown for controlling the lubricant in the continuous casting mold by electrically sensing the force required to withdraw the solidified ingot from the mold and adjusting the amount of lubricant in direct relation to the force.

Improved methods for making copper rod are still desired however, and it is therefore an object of the present invention to provide a method for effectively making copper rod by controlling the water-soluble oil emulsion used in the production of copper rod by rolling.

It is another object of this invention to provide a continuous in-line method for controlling the water-soluble oil emulsion in the production of copper rod by rolling.

These and other objects and advantages of the present invention will become readily apparent from the following description and illustrative embodiments.

SUMMARY OF THE INVENTION

It has now been discovered that the rolling of copper to produce copper rod may be improved by effectively controlling the water-soluble oil emulsion used to lubricate the rolls by employing a conductivity probe to maintain the conductivity of the emulsion within desired operating limits. The conductivity measurement has been unexpectedly found to be substantially unaffected by process conditions or contaminants building-up in the emulsion during the rolling operation and maintenance of only the conductivity within set limits increases the effectiveness of using the water-soluble oil resulting in an enhanced efficient and economical rolling operation. Samples may be taken from the emulsion periodically and easily measured by a conductivity meter or, preferably, an in-line conductivity probe may be employed to continually monitor and control the water-soluble oil conductivity level. Roll life has been dramatically improved over the prior art control methods and cost savings from using less make-up oil and longer life of the emulsion have significantly increased the efficiencies and economics of the rolling operation.

DESCRIPTION OF THE PREFERRED EMBODIMENTS

Copper is continually cast using known techniques to produce a convenient shape which is rolled through a series of roll stands to the desired size. Generally, the casting is square or rectangular and dimensions may range widely, e.g., 60 millimeters (mm.) to 128 mm. The copper casting is fed to the roll mills at hot forming temperatures for copper of about 750 to 1000° C. and is upon leaving the rollers then generally cooled, coiled and chemically treated as is conventional in the art as shown in U.S. Pat. No. 4,754,803, which patent is hereby incorporated by reference.

The water-soluble oil emulsion is employed at a temperature of about room temperature to 60° C., preferably 32° to 50° C. for flooding the rolls and, upon falling into the pan beneath the rolls, is pumped to a sump for further processing. In one embodiment, the emulsion may be pumped directly from the sump through a cooler or heater back to the rolling mills and/or through a filter to remove particles such as copper and copper oxide. If the emulsion is pumped through a filter, a filter sump is preferably used from which the emulsion can be pumped through the cooling/heating system to the mills.

Samples of the emulsion are preferably taken after filtration and, in the most preferred embodiment, an in-line conductivity probe is employed to control and monitor the emulsion conductivity level. It is preferred that the in-line probe be installed in a pipe wherein the emulsion is in turbulent flow to minimize fouling of the probe.

A conductivity probe which has proven effective is Rosemount Uniloc Conductivity Probe Model No. 141 made by Rosemount Analytical, Uniloc Division, 2400 Barranca Parkway, Irvin, Calif. The probe is temperature compensated for 25° C. and therefore provides a standard measurement regardless of the temperature of the emulsion. The probe is preferably positioned in a recycle filter sump slip stream line.

Any suitable water-soluble oil may be employed in the emulsion and a preferred oil is Rodshield 37 made by StuartIronsides, Inc., Willowbrook, Ill. A concentration of about 0.5 to 6.5%, by weight, may be employed with a preferred level being about 0.5–4% and a highly preferred level being about 3.5 to 3.7%.

The conductivity is related to the concentration of the water-soluble oil but has been found to be constant and substantially unaffected by contaminants or process conditions. Control of the process measuring only the conductivity provides the enhanced operating results of the invention and a level of 5500 to 6500 micro mhos/cm$^3$, preferably 5900 to 6100 micro mhos/cm$^3$, compensated for 25° C., for the Rodshield 37 has been found to be effective. The conductivity levels for other oils may vary as will be appreciated by those skilled in the art and once the optimum oil concentration is ascertained for a new water-soluble oil emulsion, the desired conductivity level range may be set and maintained at this level during the entire rolling operation.

The results obtained in a commercial copper rod production facility clearly demonstrates the improved roll life and operating efficiencies achieved when using the method of the invention. Thus, over a one month period the roll life averaged about 12 hours when using an in-line conductivity probe to maintain the water-soluble oil emulsion conductivity between about 5900 to 6100 micro mhos/cm$^3$ (about 3.6 weight % oil). Prior commercial practice, where the oil concentration was controlled by a Refractometer and ranged from 0.75 to 6.5%, resulted in an average roll life of about 4 hours.

While the invention has been described in relation to the manufacture of copper rod by rolling, it is anticipated that other commercial uses could employ conductivity as a process control means. Thus, related rolling operations for aluminum, steel, copper alloys, etc. and wire drawing manufacturers may use the disclosed process. Other uses include controlling wax concentrations, rinse tanks and pickle tanks, and other associated operations employed in rolling operations.

It will be apparent that many changes and modifications of the several features described herein may be made without departing from the spirit and scope of the invention. It is therefore apparent that the foregoing description is by way of illustration of the invention rather than limitation of the invention.

I claim:

1. In a method for making copper rod wherein a copper bar is reduced by hot rolling into copper rod in a series of roll strands having deforming rollers which are lubricated with a water-soluble oil-water emulsion, the water-soluble oil-water emulsion is analyzed during the rolling operation for water-soluble oil content, and the oil level is adjusted based on that analysis, the improvement comprising the steps of (a) predetermining a range of conductivity values of the emulsion based on a desired range of water-soluble oil concentration operating values; (b) measuring the conductivity of the emulsion during the rolling operation; (c) comparing the measured conductivity of the emulsion with said predetermined range of conductivity values; (d) adjusting, if necessary, the water-soluble oil concentration of the emulsion to maintain both the conductivity within said predetermined range of conductivity values and the water-soluble oil concentration within said range of operating values; and (e) repeating steps (b)–(d) during the rolling operation.

2. The method of claim 1 wherein the conductivity is controlled using an in-line conductivity probe.

* * * * *